US006400645B1

(12) United States Patent
Travor (10) Patent No.: US 6,400,645 B1
(45) Date of Patent: Jun. 4, 2002

(54) SONOBUOY APPARATUS (75) Inventor: Bruce W. Travor, Southhampton, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/981,359

(22) Filed: Oct. 11, 2001

(51) Int. Cl.[7] .................................................. H04B 1/59
(52) U.S. Cl. ................... 367/4; 367/3; 367/153
(58) Field of Search ................... 367/3, 4, 153; 89/1.11; 114/21.1, 21.2, 21.3, 22

(56) References Cited

U.S. PATENT DOCUMENTS 3,290,642 A * 12/1966 Mason et al. .................. 367/3
3,803,540 A * 4/1974 Mar et al. ...................... 367/4
3,921,120 A * 11/1975 Widenhofer .................. 367/4
4,656,616 A * 4/1987 Bennett et al. ............. 367/153
5,197,036 A * 3/1993 Buckingham .................. 367/4

* cited by examiner

Primary Examiner—Ian J. Lobo
(74) Attorney, Agent, or Firm—Ron Billi (57) ABSTRACT

Sonobuoy apparatus which fits into an A sized canister for use in the water environment. The apparatus includes an array of telescopic arms connected by hinges to a housing which contains receiver transducer electronics. An acoustic projector bears against projections on the last arm section of each arm such that it will cause the nested arm sections to extend while dropping through the water. When the canister falls free, an arm deployment arrangement causes the arms to assume a horizontal orientation. These deployed arms carry receive transducers for detecting acoustic echos from a potential target.

9 Claims, 8 Drawing Sheets

SONOBUOY APPARATUS

STATEMENT OF GOVERNMENT INTEREST

The invention described herein may be manufactured and used by or for the Government of the United States of America for government purposes without the payment of any royalties therefor.

BACKGROUND OF THE INVENTION

A sonobuoy is a device utilized for the detection of submerged targets in the water environment. Typically, a sonobuoy is launched from a relatively slow flying aircraft, and after launch a parachute is deployed to slow the sonobuoy descent. Upon entering the water, the parachute is decoupled and a surface flotation unit is activated. This surface floatation unit generally contains transmitter/receiver equipment, along with an antenna.

Tethered to this surface flotation unit, and extending vertically in the water column below the surface flotation unit, is a transducer array utilized to detect acoustic signals from a potential target. In a passive system, these acoustic signals may emanate from a target to be detected and are received by a transducer array. Alternatively, the sonobuoy apparatus may include an active acoustic projector, in which case the transducer array detects the acoustic signals reflected from the target. These detected signals are provided to the transmitter at the floatation unit which, upon command, transmits them to a remote location, such as the deploying aircraft.

A common type of sonobuoy in use is an active "A" size sonobuoy which is packaged in a cylindrical container having a length of around 3 feet and a diameter of around 5 inches. Basically, in acoustic systems, the larger the receive array, the greater will be the sensitivity of the system. However, a large receive array is incompatible with a relatively small sonobuoy container. To achieve the sensitivity of a large receive array, many small sonobuoys, or larger sized containers must be utilized. The present invention provides a solution to this incompatibility problem.

SUMMARY OF THE INVENTION

Sonobuoy apparatus in accordance with the present invention includes a weighted canister for insertion into a water environment to detect potential targets. Packaged within the canister is a surface unit containing transmitter/receiver equipment for communication with a remote location, such as the launching aircraft or vessel. The canister also includes a support unit, which may be constituted by a housing for receive transducer electronics. A plurality of arms is provided, each arm including a plurality of nested telescopic arm sections, with a first of said arm sections being connected to the support unit in a manner such that the arm is capable of limited upward rotation after the canister pulls free and falls away. A weight member, which may be an acoustic projector if the sonobuoy is an active sonobuoy, bears against the lower portion of each arm section and causes extension of the nested arm sections, as the sonobuoy falls through the water column, and before the canister pulls away and falls free. After the canister pulls away and falls free, an arm deployment arrangement deploys the extended arms to a desired orientation, such as horizontal. The deployed arms carry receiver transducers for the detection of target signals.

BRIEF DESCRIPTION OF THE DRAWINGS

The invention will be better understood, and further objects, features and advantages thereof will become more apparent from the following description of the preferred embodiment, taken in conjunction with the accompanying drawings, in which.

DETAILED DESCRIPTION OF THE PREFERRED EMBODIMENTS

In the drawings, which are not necessarily to scale, like or corresponding parts are denoted by like or corresponding reference numerals.

Figure 1:
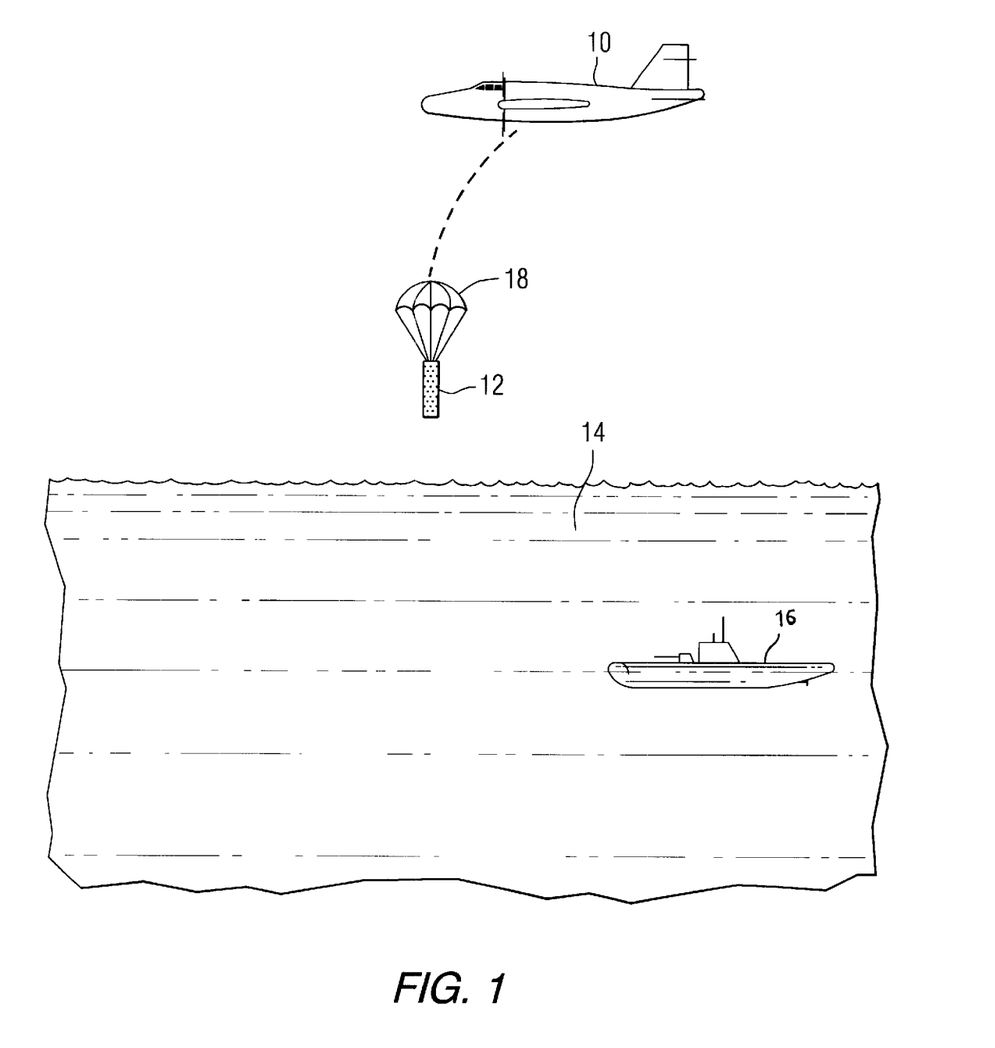
FIG. 1 illustrates the deployment of a sonobuoy.

FIG. 1 depicts an aircraft 10 launching a sonobuoy 12 into the water environment 14, in order to detect acoustic emissions or reflections from a potential target 16. Sonobuoy 12 is ejected from the aircraft, and a parachute 18 is opened to slow the descent and entry into the water of the sonobuoy 12. Upon entry into the water 14, the parachute 18 is automatically separated from the remainder of the sonobuoy. Although a conventional aircraft 10 is illustrated, the sonobuoy may also be launched from a helicopter or surface vessel.

Figure 2:
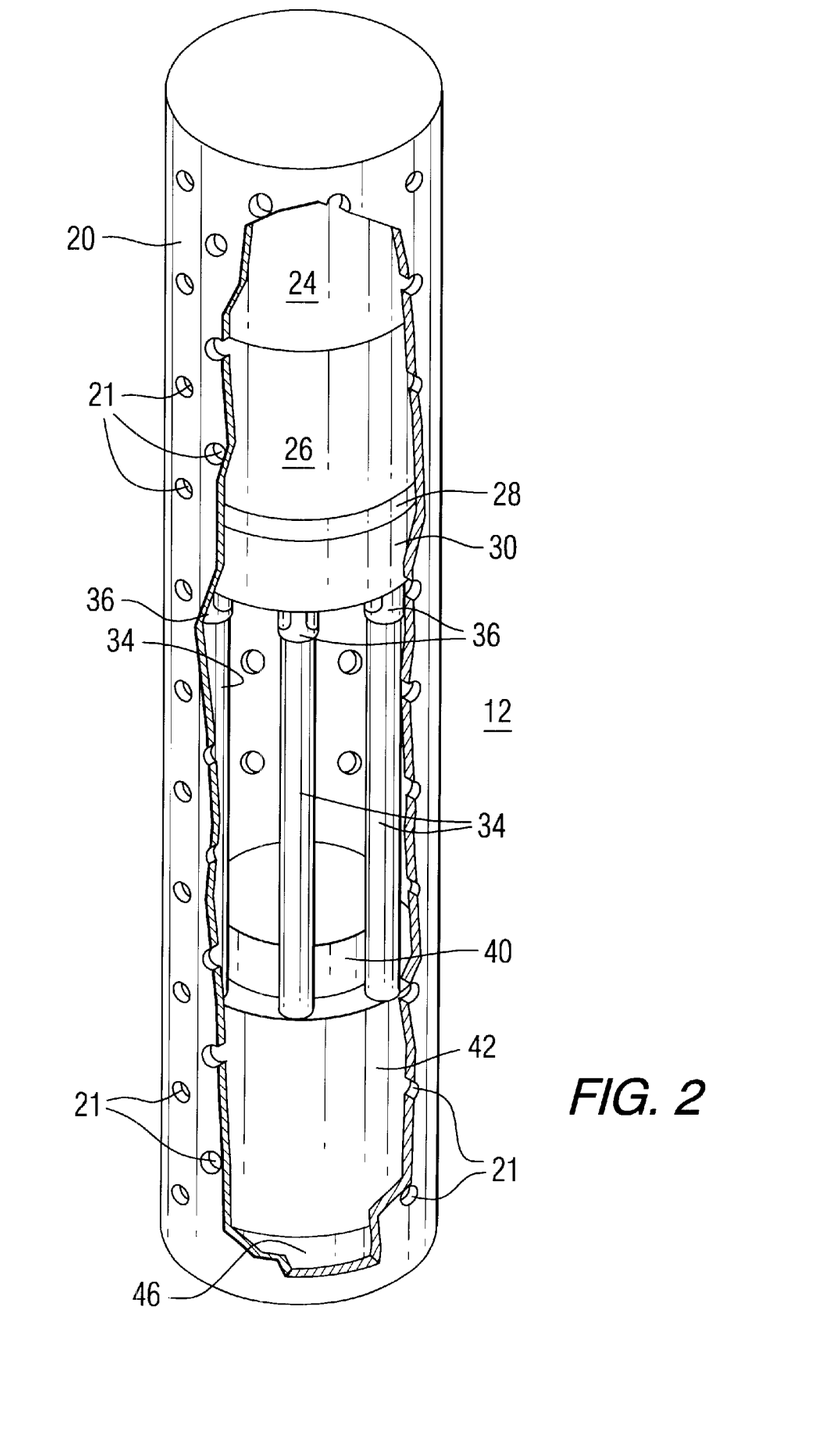
FIG. 2 is a cut-away view of a sonobuoy in accordance with one embodiment of the present invention.

As illustrated in the simplified cut-away view of FIG. 2, the components of the sonobuoy 12 are packaged in an A-sized canister 20 having a plurality of apertures 21 to facilitate water entry into the interior of the sonobuoy. The sonobuoy 12 includes, at its upper end, a first section 24 which contains components such as the parachute 18, as well as a surface flotation element, transmitter/receiver equipment and an antenna.

A second section 26 includes cables and other tether lines and baffles commonly used to counter effects of rapid underwater currents. A vertical motion damper 28 is disposed directly below section 26.

In accordance with the present invention, there is included a support unit 30 which carries a plurality of vertically disposed telescoping arms 34, connected to the support unit 30 by means of respective hinge members 36. In a preferred embodiment, to conserve space, the support unit 30 is constituted by a housing for the receiver electronics associated with transducers of a receiver array, to be described. These receiver transducers, along with certain wires are located within the volume below the support unit 30, but are not shown in FIG. 2, for clarity.

An acoustic projector 40 is located near the distal ends of the telescoping arms 34 and is supplied with drive signals from unit 42, which also includes a heavy battery for supplying power to projector/transducer components of the sonobuoy 12. A standard sonobuoy weight 46 attached to the end of canister 20 will carry the canister 20 away from the apparatus when fully deployed in the water column.

Figure 3:
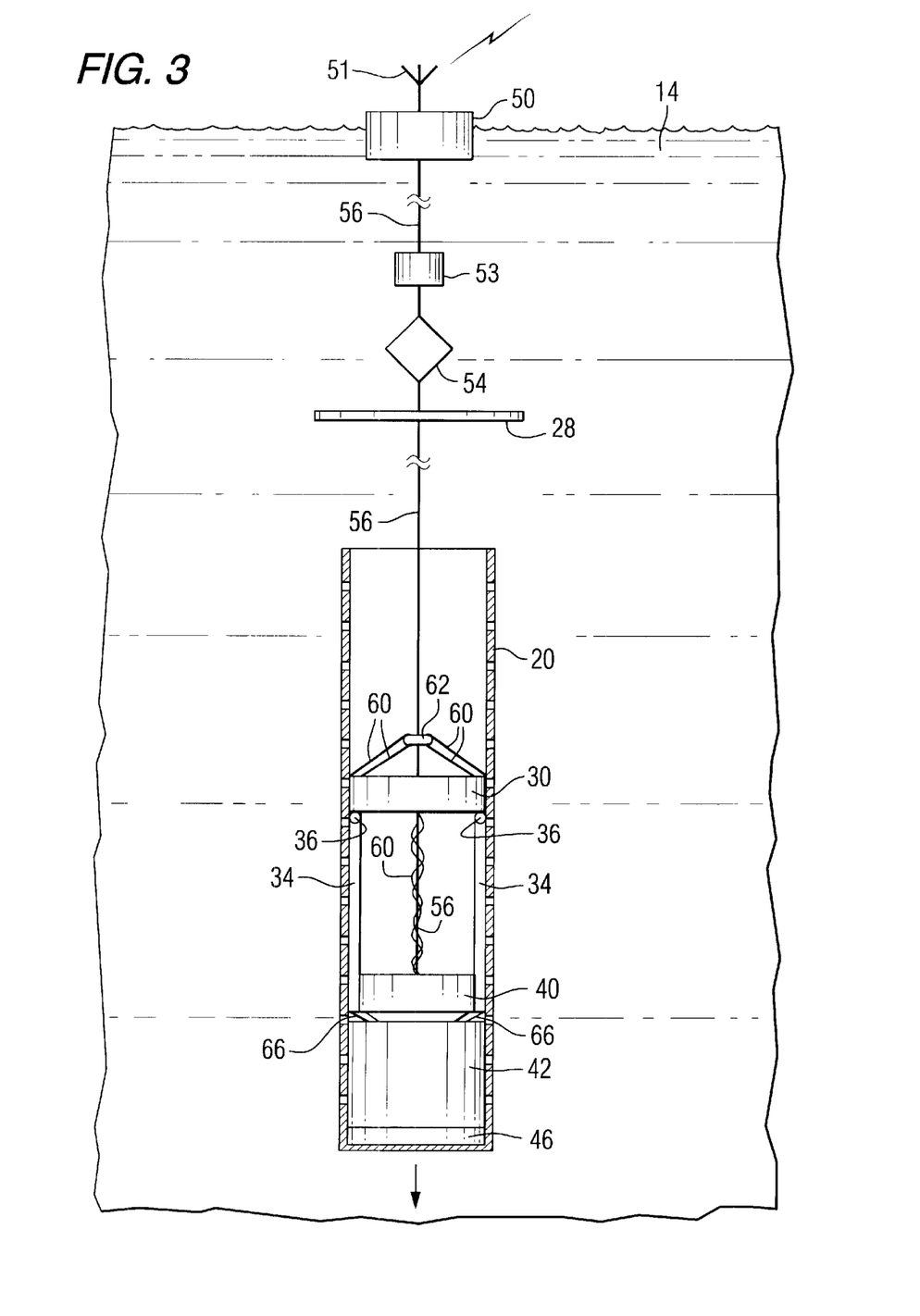
FIG. 3 illustrates the sonobuoy of FIG. 2 as it descends in the water column.

FIG. 3 illustrates the apparatus in the water with the first and second sections 24 and 26 deployed out of the canister 20. Shown in FIG. 3 is a surface flotation element 50 which carries the transmitter/receiver equipment and an antenna 51, for communication with a remote location, such as the launching aircraft. Tethered below the flotation element 50 are baffles 53 and 54, as well as the vertical movement damper 28. Tether line 56 passing vertically through the depicted elements represents various electrical/mechanical lines, in the form of cables and high strength synthetic polymer wires of a material such as Kevlar, a registered trademark and product of E. I. DuPont de Nemours and company.

Some of these high strength synthetic polymer wires, designated by the numeral 60, are attached to the projector 40 and are utilized as part of an arrangement to deploy the arms 34, when fully extended, into a horizontal configuration. The arrangement includes a wire guide 62 for directing the wires 60 which are attached to the projector 40, to the respective ends of the arms 34. The arms 34 include, at their lower end, an angular projection 66 which bears against the bottom of the projector. When that portion of line 56 which is connected from the surface float to the receiver electronics unit 30 is taut, downward movement of the receiver electronics unit 30 is stopped. The forward momentum of the projector 40 however, acting on the projections 66 at the end of the arms, causes the telescopic arms 34 to extend, as illustrated in FIG. 4.

Figure 4:
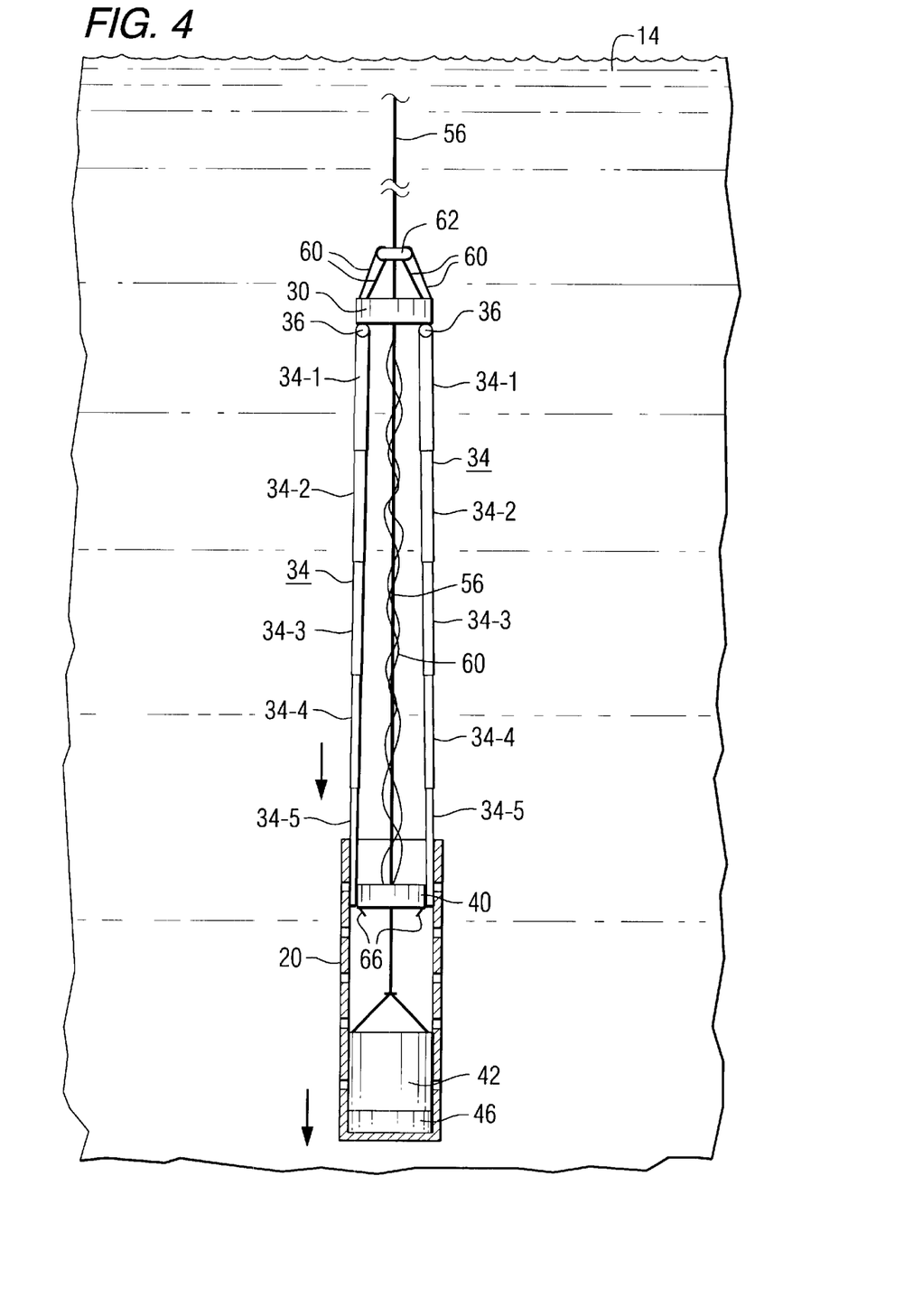
FIG. 4 illustrates the extension of telescopic arms of the sonobuoy.

FIG. 4 shows each arm 34 fully extended and consisting of 5 sections labeled 34–1 to 34–5. Five sections are shown by way of example, it being understood that more (or fewer) sections, as well as more or fewer arms, could be utilized, depending upon the size of the receiver array desired and the physical space available in the canister 20. In FIG. 4 the projector 40 still has downward momentum, as does the battery/driver unit 42 and weighted canister 20. The arms 34 however are constrained from upward rotation about their respective hinge members 36 since the lower ends of the arms 34 are still in the upper portion of the downwardly falling canister 20.

Figure 5:
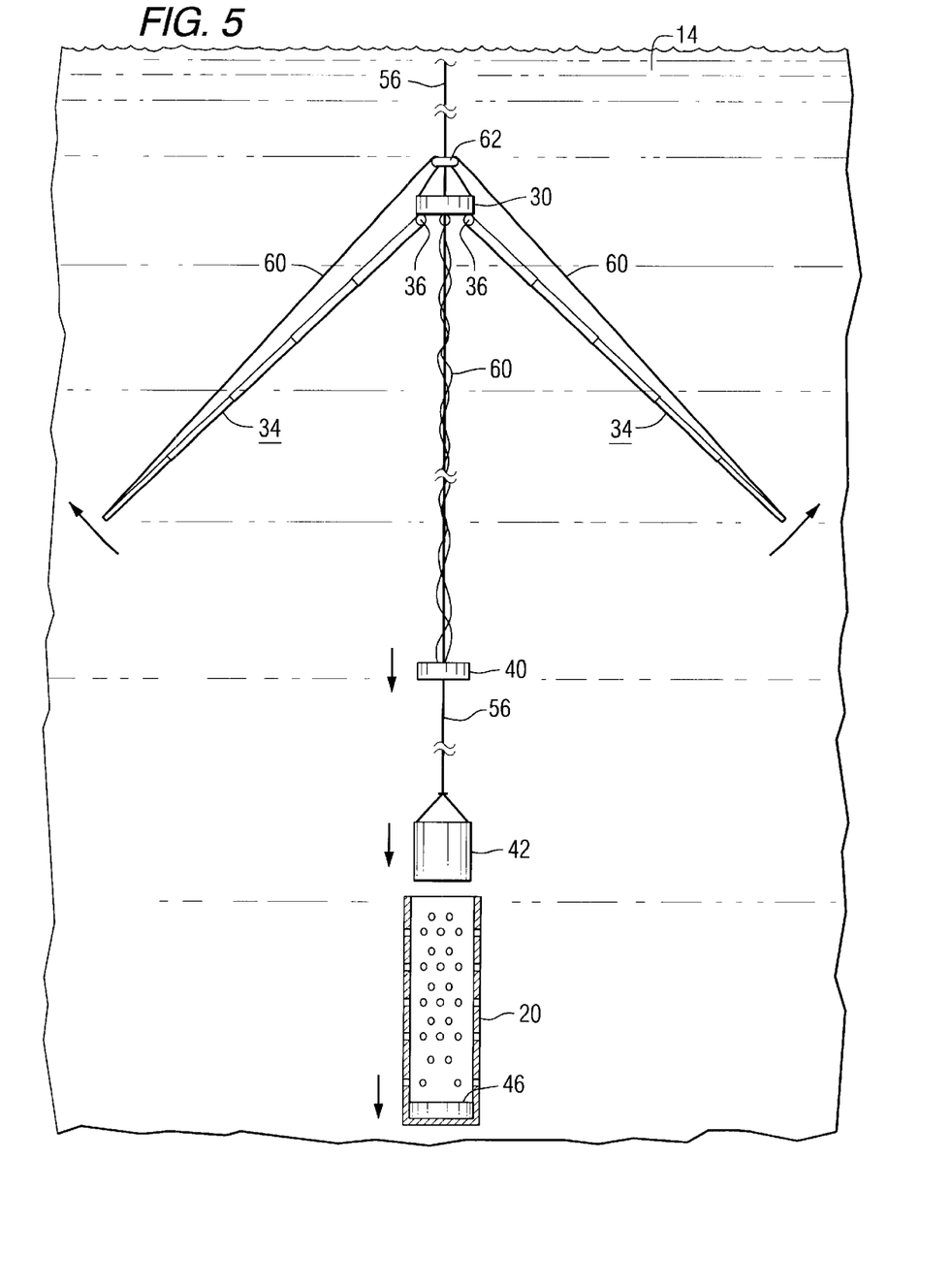
FIG. 5 illustrates the unfolding of the telescopic arms.

When the descending canister 20 drops beyond the lower ends of the arms 34, and as illustrated in FIG. 5, the arms 34 are allowed to rotate about their respective hinge members 36. This is the result of projections 66, at the end of arms 34 becoming decoupled from the bottom of projector 40. This decoupling may be activated by the normal lateral water currents encountered, or may be accomplished by spring loading the projections 66, by way of example. Continued downward momentum of projector 40 causes lateral deployment of arms 34 by virtue of wires 60 connected from projector 40 to the end of each arm 34, via wire guide 62. This operation may also be accomplished by means of a weight to which the wires 60 would be attached, such as in a passive system which would not carry a projector.

Figure 6:
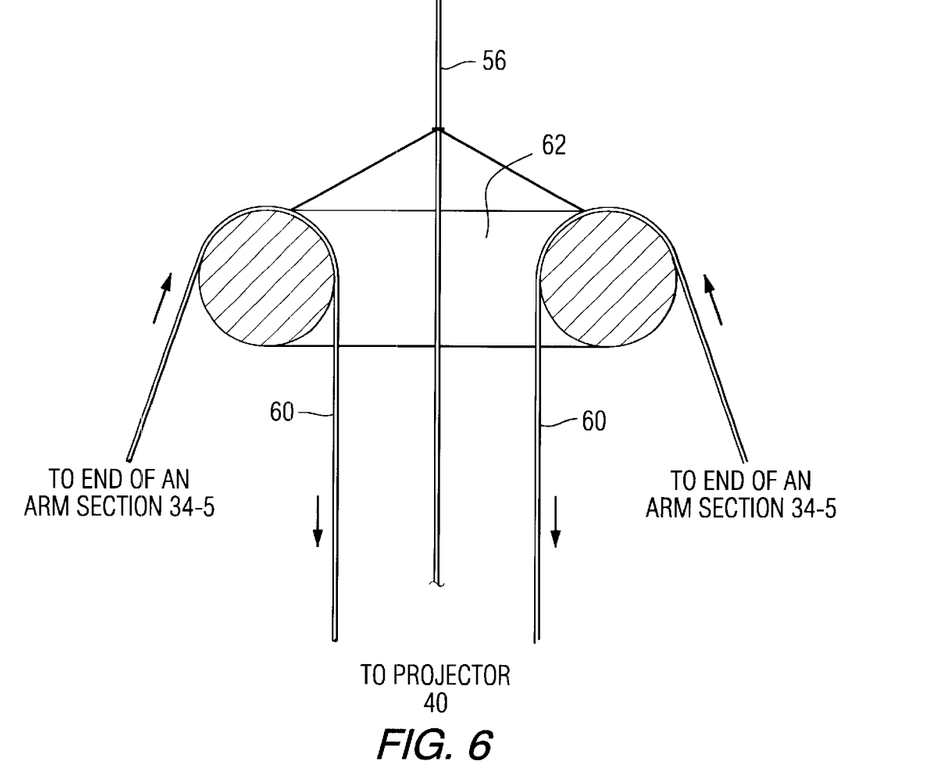
FIG. 6 is a cross-sectional view of a wire-guiding component of the apparatus.
Figure 7:
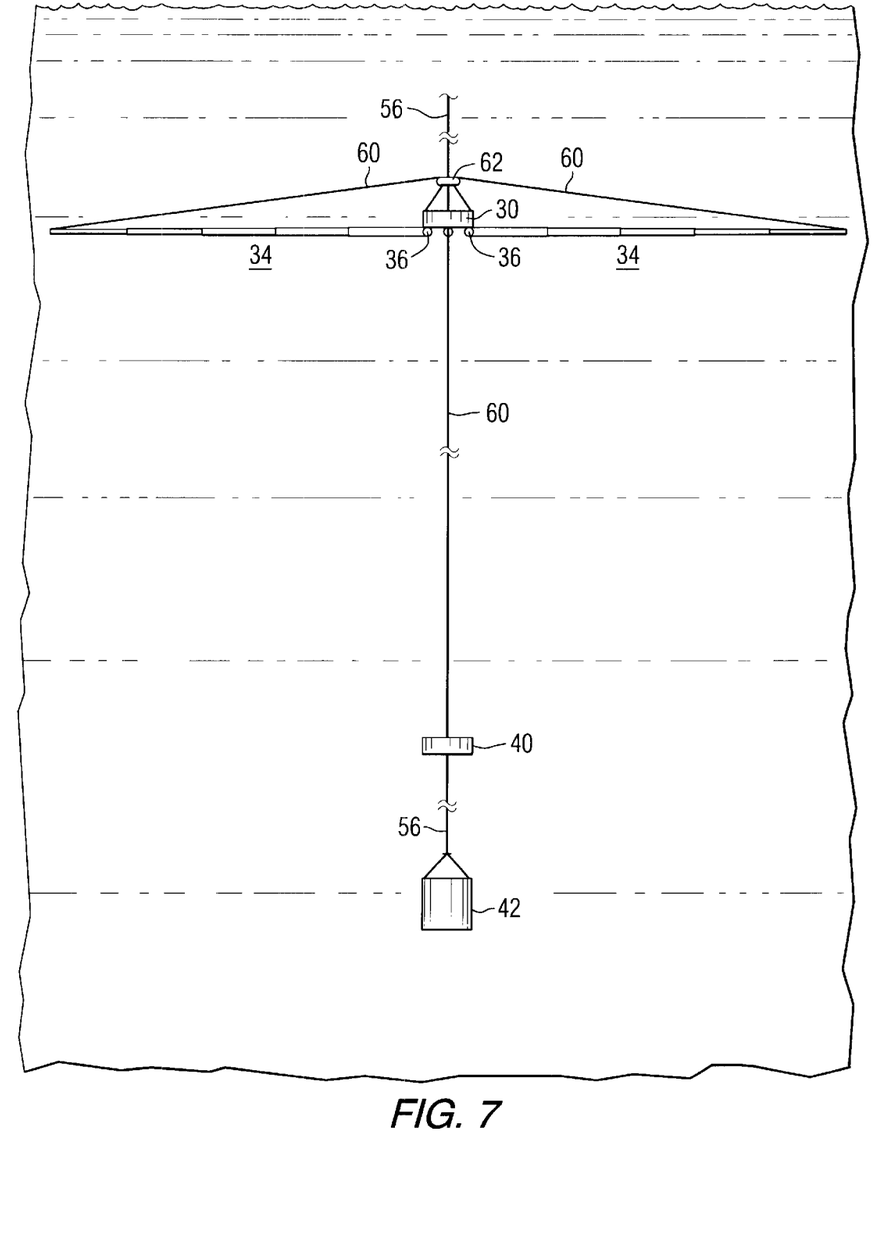
FIG. 7 illustrates the apparatus in a fully deployed condition.

With additional reference to FIG. 6, the wire guide 62, securely attached to line 56, may take the form of a toroid through the center of which passes line 56, as well as wires 60. The cross-sectional view of FIG. 6 shows a smooth, gently curving surface of the toroid, over which the wires 60 pass, to ensure for a smooth deployment of the arms 34. In one embodiment, this deployment of the arms 34 results in a horizontal orientation, as illustrated in FIG. 7, although a conical shape is also possible by providing hinge members 36 with limited angular movement, that is, less than 90°.

Figure 8:
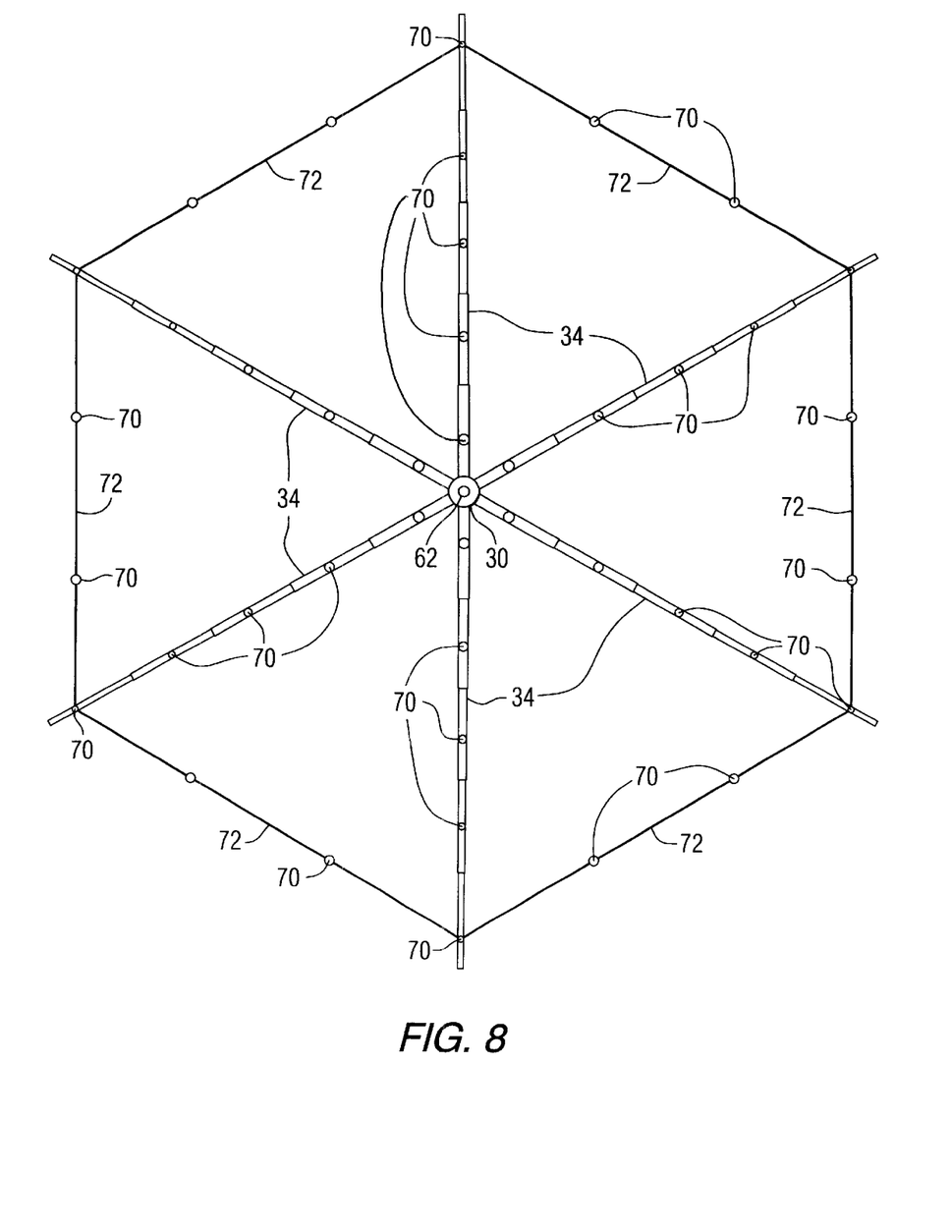
FIG. 8 is a plan view of the deployed telescopic arms.

The weight of projector 40 and battery 42 is such as to apply enough tension on wires 60 to maintain the desired arm orientation. A plan view of the deployed arms 34 is shown in FIG. 8 which also shows a plurality of receive transducers 70 arranged on the surface of the arms. In addition, receive transducers 70 may also be attached to chordal tension lines 72 stretched between the arms 34 near their lower ends. The arrangement provides for a relatively large and structurally rigid array with excellent sensitivity in a dynamic sea state.

Figure 9:
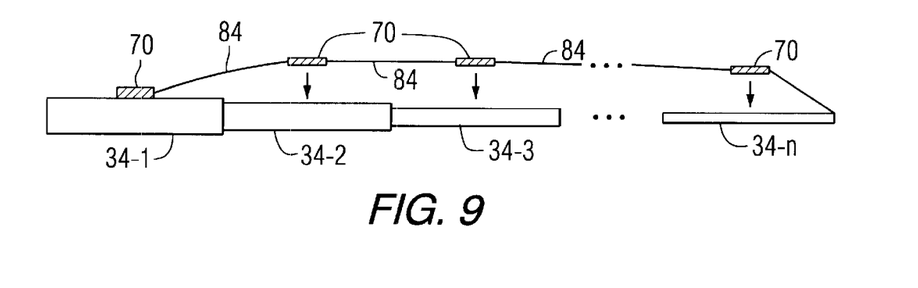
FIG. 9 illustrates the placement of transducers of the receiver array.

The operative relationship of the receive transducers 70 with the arm sections 34–1 to 34–5 (or broadly, 34–n) may be accomplished in a number of ways. For example, FIG. 9 illustrates a first receive transducer 70 firmly attached to the outside surface of the first arm section 34–1. Subsequent receive transducers 70 are interconnected by an electromechanical line 84, the end of which is attached to the end of arm section 34–n. As the arm 34 is deployed, and line 84 extended, each receive transducer 70 will come into contact with a respective arm section and will be carried by it, as illustrated in the plan view of FIG. 8. If desired, additional attachments may be made to the last arm section to accommodate more such transducers.

It will be readily seen by one of ordinary skill in the art that the present invention fulfills the object set forth herein. After reading the foregoing specification, one of ordinary skill in the art will be able to effect various changes, substitutions of equivalents and various other aspects of the present invention as broadly disclosed herein. It is therefore intended that the protection granted hereon be limited only by the definition contained in the appended claims and equivalents. Having thus shown and described what is at present considered to be the preferred embodiment of the present invention, it should be noted that the same has been made by way of illustration and not limitation. Accordingly, all modifications, alterations and changes coming within the spirit and scope of the present invention are herein meant to be included.

What is claimed is:

1. An active sonobuoy apparatus packaged in a weighted canister for insertion into a water environment, after which said canister pulls free and falls away, comprising:

a surface unit including transmitter/receiver equipment for communication with a remote location, and which includes a tether extending downwardly therefrom;

a support unit secured to said tether;

a plurality of arms, each said arm including a plurality of nested telescopic arm sections;

each said arm having a first arm section connected to said support unit and angularly moveable with respect to said support unit;

an acoustic projector;

each said arm having a last arm section in operative contact with said acoustic projector in a manner such that as said apparatus falls through the water environment, and prior to said canister pulling free and falling away, said acoustic projector causes extension of said nested telescopic arm sections;

an arm deployment arrangement for deploying said extended arms to a desired angular position, after said canister pulls free and falls away, and a plurality of receive transducers carried by said deployed arms.

2. The active sonobuoy apparatus according to claim 1 wherein:

said arms are connected to said support unit by hinges.

3. The active sonobuoy apparatus according to claim 1 wherein:

said apparatus includes receiver electronics electrically connected to said receive transducers;

said receiver electronics being housed in a receiver electronics unit;

said receiver electronics unit being housed in said support unit.

4. The active sonobuoy apparatus according to claim 1 wherein:

said desired angular position is horizontal.

5. The active sonobuoy apparatus according to claim 1 wherein:

said arm deployment arrangement includes a wire guide secured to said tether, and a plurality of wires, each having one end connected to said acoustic projector and another end connected to an end of a respective arm, each said wire passing through said wire guide.

6. The active sonobuoy apparatus according to claim 5 wherein:

said wire guide is in the form of a toroid.

7. The active sonobuoy apparatus according to claim 1 which includes:

chordal tension lines connected to, and extending between, adjacent ones of said deployed arms.

8. The active sonobuoy apparatus according to claim 7 which includes:

receive transducers carried by said chordal tension lines.

9. The active sonobuoy apparatus of claim 1 wherein each said last arm section includes an angular projection that bears against a bottom of said acoustic projector such that said acoustic projector causes extension of said nested telescopic arm sections.

* * * * *